(12) United States Patent
Ahn et al.

(10) Patent No.: US 9,933,655 B2
(45) Date of Patent: Apr. 3, 2018

(54) POLARIZER AND DISPLAY DEVICE COMPRISING THE SAME

(71) Applicant: SAMSUNG DISPLAY CO., LTD., Yongin-si, Gyeonggi-do (KR)

(72) Inventors: Taeyoung Ahn, Suwon-si (KR); Jihoon Oh, Daegu (KR)

(73) Assignee: SAMSUNG DISPLAY CO., LTD. (KR)

( * ) Notice: Subject to any disclaimer, the term of this patent is extended or adjusted under 35 U.S.C. 154(b) by 84 days.

(21) Appl. No.: 14/887,916

(22) Filed: Oct. 20, 2015

(65) Prior Publication Data

US 2016/0202552 A1 Jul. 14, 2016

(30) Foreign Application Priority Data

Jan. 13, 2015 (KR) .................. 10-2015-0006337

(51) Int. Cl.
*G02F 1/1335* (2006.01)
*G02B 5/30* (2006.01)
*G02B 1/18* (2015.01)

(52) U.S. Cl.
CPC ......... *G02F 1/133528* (2013.01); *G02B 1/18* (2015.01); *G02B 5/3058* (2013.01); *G02F 2001/133548* (2013.01); *Y10T 428/10* (2015.01); *Y10T 428/1041* (2015.01); *Y10T 428/1059* (2015.01)

(58) Field of Classification Search
CPC ......... G02F 1/133528; G02F 1/133536; G02F 1/136209; G02F 2001/133548; G02B 1/14; G02B 5/3085; B82Y 10/00; B82Y 30/00; B82Y 40/00; Y10T 428/10; Y10T 428/1041; Y10T 428/1059
USPC ....... 428/1.1, 1.31, 1.5; 349/96; 359/485.05; 427/163.1

See application file for complete search history.

(56) References Cited

U.S. PATENT DOCUMENTS

| 2009/0153961 | A1 | 6/2009 | Murakami et al. |
| 2012/0160802 | A1* | 6/2012 | Kim ..................... G02B 5/3058 216/13 |
| 2014/0016059 | A1 | 1/2014 | Lee et al. |

FOREIGN PATENT DOCUMENTS

| KR | 10-2007-0092233 A | 9/2007 |
| KR | 10-2008-0036995 A | 4/2008 |

OTHER PUBLICATIONS

Nobuyoshi Awaya et al., "Selective Deposition of Silicon Oxide Using a Plasma-Fluorinated Resist Mask", Japanese Journal of Applied Physics, vol. 27, No. 7, Jul. 1988, pp. 1172-1175.

* cited by examiner

*Primary Examiner* — Ruiyun Zhang
(74) *Attorney, Agent, or Firm* — Innovation Counsel LLP

(57) ABSTRACT

A polarizer includes a substrate; a plurality of metal lines on the substrate, the plurality of metal lines each having a first width and a first height and being spaced apart from and parallel to each other with a first gap therebetween; and a hydrophobic coating layer on the metal line. The polarizer may be directly formed on the substrate, allowing for manufacture of light-weight and thin film structure of display device.

18 Claims, 7 Drawing Sheets

POLARIZER AND DISPLAY DEVICE COMPRISING THE SAME

CROSS-REFERENCE TO RELATED APPLICATION

This application claims priority to and the benefit of Korean Patent Application No. 10-2015-0006337 filed on Jan. 13, 2015 with the Korean Intellectual Property Office, the content of which is incorporated herein in its entirety by reference.

BACKGROUND

1. Field

The present disclosure relates to a polarizer and a display device including the polarizer.

2. Description of the Related Art

Some display devices display images using an element that is capable of emitting light. Among this type of display devices, flat panel display devices are widely used today. One representative example is a liquid crystal display (LCD) device.

The LCD device includes at least a pair of electric-field generating electrodes, a liquid crystal layer interposed between a pair of substrates, and a polarizer for polarizing light that is incident to the liquid crystal layer. Upon applying voltage to the electric-field generating electrode of the LCD device, an electric-field is generated over the liquid crystal layer, such that orientation of liquid crystal molecules of the liquid crystal layer may be determined and polarization of the incident light may be controlled. Accordingly, images may be displayed on the LCD device.

In general, the polarizers are separately manufactured apart from a substrate, and then attached to the substrate. However, in order to realize a light-weight and thin film structure of display devices, there have been attempts to form the polarizer directly on the substrate.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments are directed to a polarizer including a wire grid disposed on a substrate.

Further, aspects of embodiments are directed to a display device including a wire grid polarizer.

According to an embodiment, a polarizer includes: a substrate; a plurality of metal lines on the substrate, the plurality of metal lines each having a first width and a first height and being spaced apart from and parallel to each other with a first gap therebetween; and a hydrophobic coating layer on the metal line.

The first width may be in a range of about 50 nm to about 200 nm.

The first height may be in a range of about 50 nm to about 250 nm.

The first gap may be in a range of about 50 nm to about 200 nm.

The hydrophobic coating layer may be a self-assembled monolayer.

The self-assembled monolayer may be a chemical compound represented by the following Chemical Formula 1:

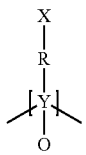

[Chemical Formula 1]

wherein Y may be one of sulfur (S), silicon (Si), phosphorus (P), and carbon (C) bonded or unbonded to a substituent; R may be one of a substituted or unsubstituted aromatic group having 6 to 30 carbon atoms, a substituted or unsubstituted heteroaromatic group having 5 to 30 carbon atoms containing one or more hetero atoms, a substituted or unsubstituted alkylene group having 1 to 20 carbon atoms, and a substituted or unsubstituted alkylene group having 1 to 20 carbon atoms and containing at least one of

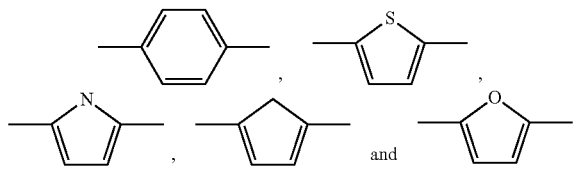

in a main chain, the substituent comprising one or more of a halogen atom, an alkyl group having 1 to 12 carbon atoms that is substituted or unsubstituted with a halogen atom, an alkoxy group, an ether group, a carboxyl group, a thiol group, and an amine group; and X may be one of $CF_n$, $CBr_m$, and a substituted or unsubstituted aryl group.

The self-assembled monolayer may have a thickness in a range of about 0.2 nm to about 5 nm.

The self-assembled monolayer may be made from a chemical compound represented by the following Chemical Formula 3:

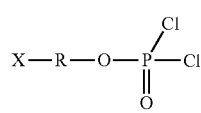

[Chemical Formula 3]

wherein R may be one of a substituted or unsubstituted aromatic group having 6 to 30 carbon atoms, a substituted or unsubstituted heteroaromatic group having 5 to 30 carbon atoms containing one or more hetero atoms, a substituted or unsubstituted alkylene group having 1 to 20 carbon atoms, and a substituted or unsubstituted alkylene group having 1 to 20 carbon atoms and containing at least one of

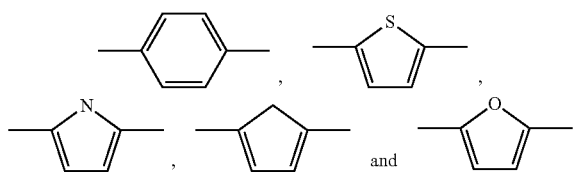

in a main chain, the substituent comprising one or more of a halogen atom, an alkyl group having 1 to 12 carbon atoms that is substituted or unsubstituted with a halogen atom, an alkoxy group, an ether group, a carboxyl group, a thiol group, and an amine group.

The chemical compound represented by Chemical Formula 3 may be represented by any one of the following Chemical Formulas 4 to 6:

[Chemical Formula 4]

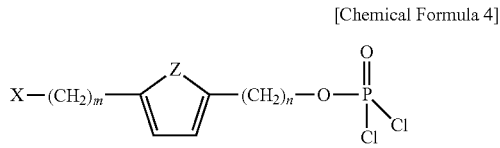

wherein Z may be one of sulfur, nitrogen, carbon and oxygen, m may be an integer selected from 0 to 20, and n may be an integer selected from 0 to 20;

[Chemical Formula 5]

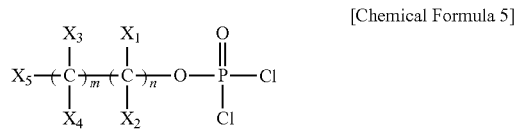

wherein $X_1$, $X_2$, $X_3$, $X_4$, and $X_5$ each may independently represent hydrogen, a halogen atom, or an alkyl group having 1 to 30 carbon atoms substituted with one or more of hydrogen, a halogen atom, oxygen or nitrogen, m may be an integer selected from 1 to 20, and n may be an integer selected from 0 to 20; and

[Chemical Formula 6]

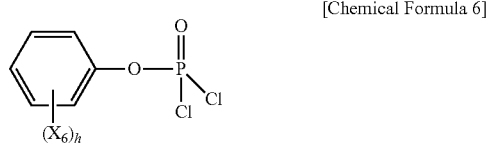

wherein $X_6$ may represent a halogen atom or $CF_3$, and h may be an integer selected from 1 to 5.

The polarizer may further include a protective layer provided in a plate form and disposed over upper portions of the plurality of metal lines.

The polarizer may further include a plurality of masks being disposed respectively on the plurality of metal lines.

The polarizer may further include a protective layer provided in a plate form and disposed over the plurality of masks.

According to an embodiment of the present invention, a display device includes: a first substrate; a plurality of metal lines on the first substrate, the plurality of metal lines each having a first width and a first height and being spaced apart from and parallel to each other with a first gap therebetween; a hydrophobic coating layer on the metal line; a second substrate; and a liquid crystal layer between the first substrate and the second substrate.

The first width may be in a range of about 50 nm to about 200 nm.

The first height may be in a range of about 50 nm to about 250 nm.

The first gap may be in a range of about 50 nm to about 200 nm.

The hydrophobic coating layer may be a self-assembled monolayer.

The self-assembled monolayer may have a thickness in a range of about 0.2 nm to about 5 nm.

The display device may further include: a plurality of metal lines on the second substrate, the plurality of metal lines each having a first width and a first height and being spaced apart from and parallel to each other with a first gap therebetween; and a hydrophobic coating layer on the metal lines.

According to embodiments of the present invention, a polarizer is capable of maintaining uniform gaps between metal lines forming a wire grid, thereby achieving excellent polarization properties.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1A:
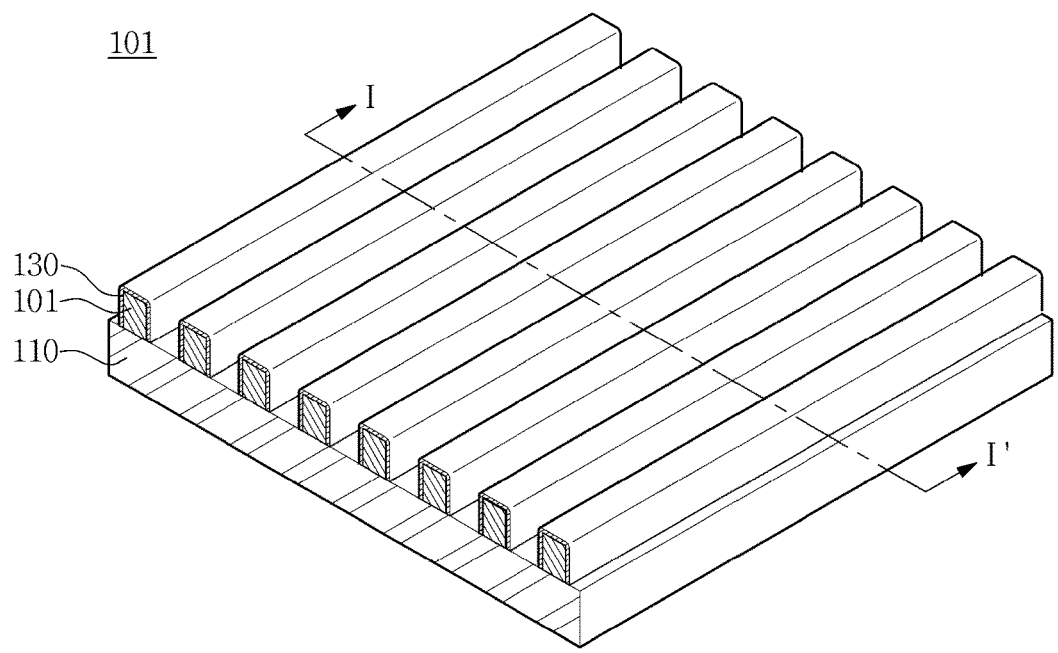
FIG. 1A is a perspective view illustrating a polarizer according to a first exemplary embodiment.

Hereinafter, embodiments of the present disclosure will be described in more detail with reference to the accompanying drawings. However, the scope of the embodiments is not limited to the specific embodiments or drawings and should be construed as including all the changes, equivalents, and substitutions included in the spirit and scope of the present inventive concept.

In the drawings, certain elements or shapes may be simplified or exaggerated to better illustrate the present inventive concept, and other elements present in an actual product may also be omitted. Like reference numerals refer to like elements throughout the specification. Thus, the drawings are intended to facilitate the understanding of the present inventive concept.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof. In addition, when a layer or element is referred to as being "on" another layer or element, the layer or element may be directly on the other layer or element, or one or more intervening layers or elements may be interposed therebetween.

In addition, when a layer or element is referred to as being "on" another layer or element, the layer or element may be directly on the other layer or element, or one or more intervening layers or elements may be interposed therebetween.

Hereinafter, a first exemplary embodiment will be described with reference to FIGS. 1A and 1B.

Figure 1B:
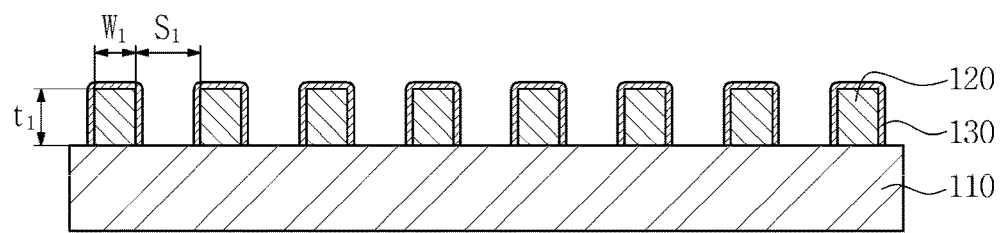
FIG. 1B is a cross-sectional view taken along line I-I' of FIG. 1A.

FIG. 1A is a perspective view illustrating a polarizer 101 according to the first exemplary embodiment; and FIG. 1B is a cross-sectional view taken along line I-I' of FIG. 1A.

Referring to FIGS. 1A and 1B, the polarizer 101 includes a substrate 110, a plurality of metal lines 120 on the substrate 110, and a self-assembled monolayer (SAM) 130, which is a hydrophobic coating layer, disposed on a surface of the metal line 120.

The substrate 110 may include materials that are found to be excellent in transmittance, thermal-resistance, and chemical-resistance. For example, the substrate 110 may include at least one of glass, polyethylene naphthalates, polyethylene terephthalate, and polyacrylate, which have excellent light transmission properties.

The plurality of metal lines 120 are disposed on the substrate 110, being parallel to each other. The metal lines 120 may each have a line shape extending in one direction and may each have a first width w1 and a first height t1. Further, the metal lines 120 adjacent to each other may be spaced apart from each other by a first gap s1.

The plurality of metal lines 120 may form a wire grid. The wire grid may function as a polarizing plate. That is, the polarizer 101 illustrated in FIGS. 1A and 1B may be a wire grid polarizer (WGP).

The metal line 120 may include one or more of aluminum (Al), gold (Au), silver (Ag), copper (Cu), chromium (Cr), iron (Fe) and nickel (Ni)

In order to achieve excellent polarization properties, the polarizer 101 should have the first gap s1, through which light may pass, be less than a wavelength of an incident light. For example, when a visible light is incident thereon, based on the fact that the wavelength of the visible light is in a range of about 400 nanometers (nm) to about 700 nm, the polarization property may be imparted when the first gap s1 is less than or equal to about 400 nm. In order to achieve a suitable polarization function, the polarizer 101 according the first exemplary embodiment may have the first gap s1 in a range of about 50 nm to about 200 nm. For example, the first gap s1 may be less than or equal to about 100 nm.

Further, an area corresponding to the first width w1 of the metal line 120, that is, an area which the metal line 120 is disposed on and thus light may fail to pass through, may be in a range of about 50 nm to about 200 nm. For example, the first width w1 may be less than or equal to about 100 nm.

In order to improve polarization efficiency, the metal line 120 may have the first height t1, corresponding to a thickness thereof, in a range of about 50 nm to about 250 nm. For example, the first height t1 may be about 150 nm.

The hydrophobic coating layer may be disposed on the surface of the metal line 120. According to the first exemplary embodiment, the hydrophobic coating layer may be the self-assembled monolayer 130.

The self-assembled monolayer 130 may have a thickness in a range of about 0.2 nm to about 5 nm. When the self-assembled monolayer 130 has a thickness less than about 0.2 nm, a film may not be readily formed; and when the self-assembled monolayer 130 has a thickness more than 5.0 nm, a surface of the self-assembled monolayer may be non-uniformly formed.

An end portion of the self-assembled monolayer 130 may be in contact with the metal line 120, while another end portion thereof that is not in contact with the metal line 120 may contain a hydrophobic group. Accordingly, the surface of the metal line 120, coated with the self-assembled monolayer 130, may have hydrophobic properties.

Figure 5:
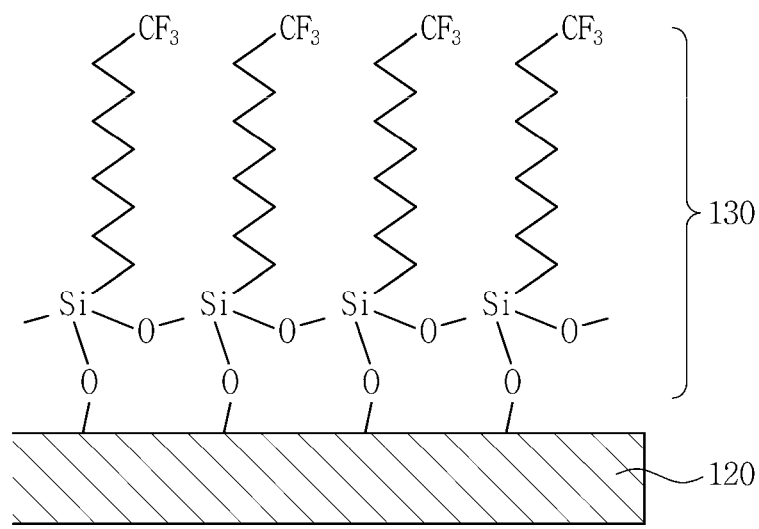
FIG. 5 is a schematic view illustrating a self-assembled monolayer.

The self-assembled monolayer 130 will be described further below with reference to FIG. 5.

Figure 2:
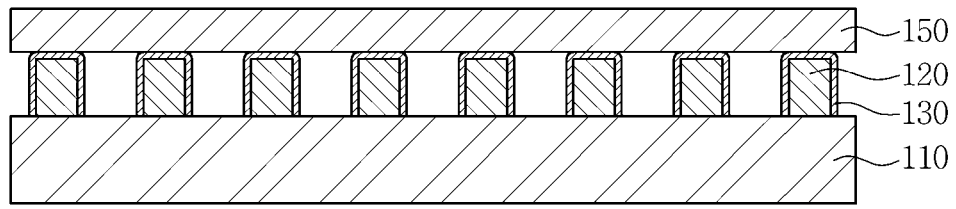
FIG. 2 is a cross-sectional view illustrating a polarizer according to a second exemplary embodiment.

Hereinafter, a second exemplary embodiment will be described with reference to FIG. 2. FIG. 2 is a cross-sectional view illustrating a polarizer 102 according to the second exemplary embodiment. Hereinafter, the repetitive descriptions pertaining to the aforementioned configurations will be omitted.

The polarizer 102 according to the second exemplary embodiment includes a substrate 110, a plurality of metal lines 120 on the substrate 110, a protective layer 150 on the metal line 120, and a self-assembled monolayer 130, which is a hydrophobic coating layer, disposed on a surface of the metal line 120.

The protective layer 150 is disposed on an upper portion of the metal line 120. The protective layer 150 may be provided in a single plate form across the plurality of metal lines 120. The protective layer 150 may include insulating materials, for example, silicon nitride ($SiN_x$). However, the material of the protective layer 150 is not limited to the silicon nitride ($SiN_x$), and the protective layer 150 may be formed of other insulating materials known in the art.

The protective layer 150 may be formed by deposition. In a case where the material for forming the protective layer is deposited on a surface of the metal line 120 or between the metal lines 120 in the deposition process of the protective layer 150, the metal lines 120 may not maintain uniform gaps therebetween, such that the polarizer 102 may exhibit deterioration in polarization properties. However, when the hydrophobic coating layer is disposed on the surface of the metal line 120 as illustrated in the second exemplary embodiment, the material for forming the protective layer 150 may not be deposited between the metal lines 120, due to hydrophobic property of the hydrophobic coating layer. The metal lines 120 may maintain uniform gaps therebetween, thereby maintaining polarization properties of the polarizer 102.

The space 132 between the metal lines 120 may be filled with atmospheric air and/or inert gas. Further, the space 132 between the metal lines 120 may be filled with a transparent polymer resin.

Figure 3:
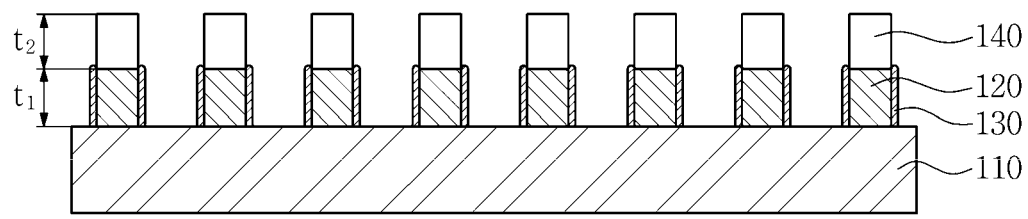
FIG. 3 is a cross-sectional view illustrating a polarizer according to a third exemplary embodiment.

Hereinafter, a third exemplary embodiment will be described with reference to FIG. 3. FIG. 3 is a cross-sectional view illustrating a polarizer 103 according to the third exemplary embodiment.

The polarizer 103 according to the third exemplary embodiment includes a substrate 110, a plurality of metal lines 120 on the substrate 110, a plurality of masks 140 on each of the metal lines 120, and a self-assembled monolayer 130, which is a hydrophobic coating layer, disposed on the surface of the metal line 120.

The masks 140 are disposed on an upper portion of each of the metal lines 120. The masks 140 may have a line shape extending in one direction as in the metal lines 120. The mask 140 may protect the upper portion of the metal line 120. The mask 140 may be formed of, for example, silicon oxide ($SiO_x$). However, the material for forming the mask 140 is not limited thereto, and the mask 140 may be formed of other insulating materials or protective-layer forming materials known in the art.

A height t2 of the mask 140 may not be particularly limited. The mask 140 may have a height the same as that of the metal line 120. Alternatively, the height t2 of the mask 140 may be more than or less than the height t1 of the metal line 120.

Figure 4:
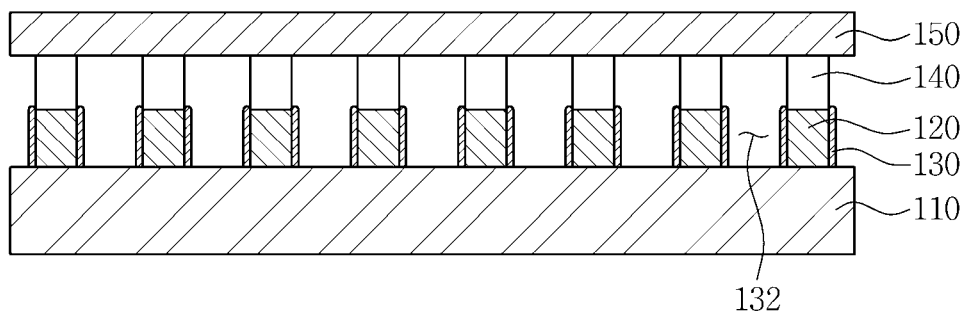
FIG. 4 is a cross-sectional view illustrating a polarizer according to a fourth exemplary embodiment.

Hereinafter, a fourth exemplary embodiment will be described with reference to FIG. 4. FIG. 4 is a cross-sectional view illustrating a polarizer 104 according to the fourth exemplary embodiment.

The polarizer 104 according to the fourth exemplary embodiment includes a substrate 110, a plurality of metal lines 120 on the substrate 110, a plurality of masks 140 on each of the metal lines 120, a protective layer 150 on the mask 140, and a self-assembled monolayer 130, which is a hydrophobic coating layer, disposed on the surface of the metal line 120.

The protective layer 150 is disposed on the mask 140. The protective layer 150 may be provided in a single plate form across the plurality of masks 140. The protective layer 150 may include insulating materials, for example, silicon nitride ($SiN_x$).

The protective layer 150 may be formed by deposition. Since the hydrophobic coating layer including the self-assembled monolayer 130 is disposed on the surface of the metal layer 120, deposition of the material for forming the protective layer may be prevented between the metal lines 120 in the deposition process. The space 132 between the metal lines 120 may be filled with air, an inert gas, and/or a transparent polymer resin.

Hereinafter, the self-assembled monolayer 130 will be described with reference to FIG. 5. FIG. 5 is a schematic view illustrating an example of the self-assembled monolayer 130.

The self-assembled monolayer 130 may be made from a chemical compound represented by the following Chemical Formula 1:

[Chemical Formula 1]

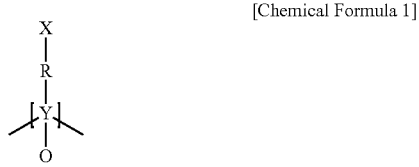

wherein Y may be one of sulfur (S), silicon (Si), phosphorus (P), and carbon (C) bonded or unbonded to a substituent;

Oxygen (O) bonded to Y may be bonded to a metal atom of the metal line 120;

R may be a substituted or unsubstituted hydrocarbon-based compound having 2 to 50 carbon atoms. For example, R may be one of: a substituted or unsubstituted aromatic group having 6 to 30 carbon atoms, a substituted or unsub- stituted heteroaromatic group having 5 to 30 carbon atoms containing one or more hetero atoms, a substituted or unsubstituted alkylene group having 1 to 20 carbon atoms, and a substituted or unsubstituted alkylene group having 1 to 20 carbon atoms and containing at least one of

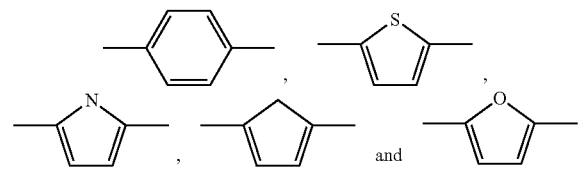

in a main chain. Herein, the substituent may be one or more of a halogen atom, an alkyl group having 1 to 12 carbon atoms that is substituted or unsubstituted with a halogen atom, an alkoxy group, an ether group, a carboxyl group, a thiol group, and an amine group; and X may be a hydrophobic group. Examples of X may include $CF_n$, $CBr_m$, a substituted or unsubstituted aryl group, and the like. Herein, n and m each are integers selected from 1 to 3. By virtue of the hydrophobic group X, the self-assembled monolayer 130 may have hydrophobic properties, and may form a hydrophobic coating layer.

Example of the chemical compound represented by Chemical Formula 1 may be made from a chemical compound represented by the following Chemical Formula 2,

[Chemical Formula 2]

wherein n is an integer selected from 1 to 30.

Examples of a chemical compound used to form the self-assembled monolayer 130 may include perfluorodecyl-phosphonic acid (PFDP), perfluorodecyldimethychlorosi-lane (PFMS); and may further include, for example, octa-decylphosphonic acid (ODP), decylphosphonic acid (DP), octylphosphonic acid (OP), end portions of which are substituted with a hydrophobic group.

Another examples of a chemical compound used to form the self-assembled monolayer 130 may include 11-mercap-toundecanoic acid (MUA), 11-hydroxy-1-undecanethiol, 12-mercaptododecanoic acid, 16-hydroxy-1-hexade-canethiol, 16-mercaptohexadecanoic acid, carboxyhexade-cyl disulfide, hydroxyhexadecyl disulfide, hydroxyundecyl disulfide, tetra(ethylene glycol) undecyl disulfide, which have an acid group at an end portion thereof substituted with a hydrophobic group.

For example, the self-assembled monolayer 130 may be made from a chemical compound represented by the following Chemical Formula 3 containing a dichloro phospho-ryl group.

[Chemical Formula 3]

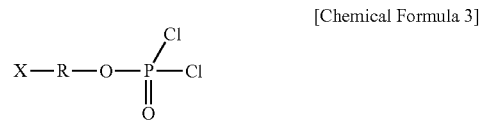

wherein R and X are identical to those defined in Chemical Formula 1.

The chemical compound represented by Chemical Formula 3 may be one of chemical compounds represented by any one of the following Chemical Formulas 4 to 6:

[Chemical Formula 4]

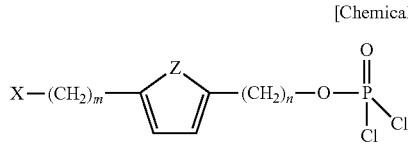

wherein Z is one of sulfur, nitrogen, carbon and oxygen, m is an integer selected from 0 to 20, and n is an integer selected from 0 to 20;

[Chemical Formula 5]

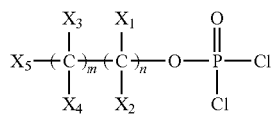

wherein $X_1$, $X_2$, $X_3$, $X_4$, and $X_5$ each independently represent hydrogen, a halogen atom, or an alkyl group having 1 to 30 carbon atoms substituted with one or more of hydrogen, a halogen atom, oxygen or nitrogen, m is an integer selected from 1 to 20, and n is an integer selected from 0 to 20; and

[Chemical Formula 6]

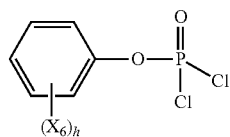

wherein $X_6$ may represent a halogen atom or $CF_3$, and h is an integer selected from 1 to 5.

Further, the chemical compound represented by Chemical Formula 3 may be one of chemical compounds represented by the following Chemical Formulas 7 to 17.

[Chemical Formula 7]

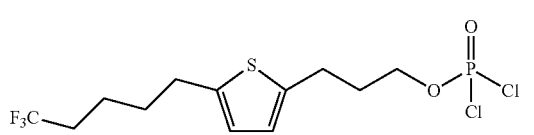

[Chemical Formula 8]

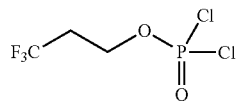

[Chemical Formula 9]

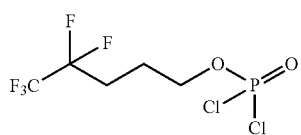

[Chemical Formula 10]

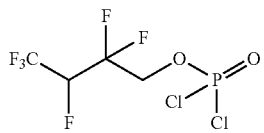

[Chemical Formula 11]

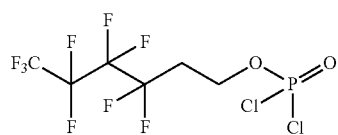

[Chemical Formula 12]

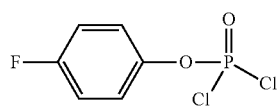

[Chemical Formula 13]

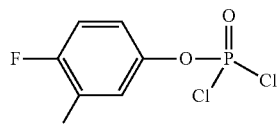

[Chemical Formula 14]

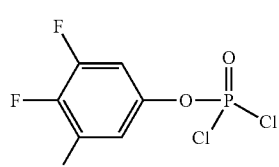

[Chemical Formula 15]

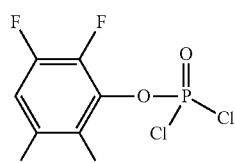

[Chemical Formula 16]

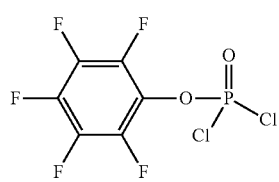

[Chemical Formula 17]

Hereinafter, a method of manufacturing the polarizer 104 according to the fourth exemplary embodiment will be described with reference to FIGS. 6A through 6G. FIGS. 6A through 6G are process diagrams illustrating a process of manufacturing the polarizer of FIG. 4.

Figure 6A:
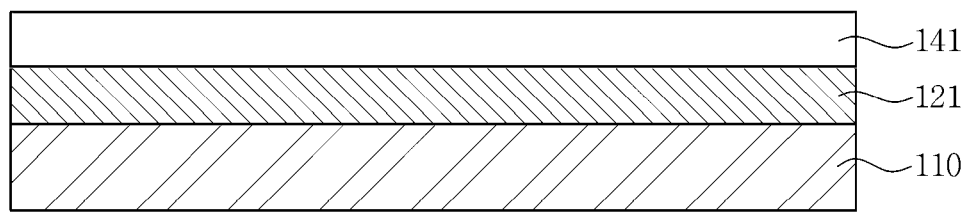
FIGS. 6A, 6B, 6C, 6D, 6E, 6F, and 6G are process diagrams illustrating a process of manufacturing the polarizer of FIG. 4.

Referring to FIG. 6A, a metal layer 121 may be formed on a substrate 110. The substrate 110 may include materials that are found to be excellent in transmittance, thermal-resistance, and chemical-resistance. For example, the substrate 110 may include at least one of glass, polyethylene naphthalates, polyethylene terephthalate, and polyacrylate, which have excellent light transmission properties.

The metal layer 121 may include one or more of aluminum (Al), gold (Au), silver (Ag), copper (Cu), chromium (Cr), iron (Fe) and nickel (Ni). The metal layer 121 may be formed by deposition. The metal layer 121 may have a thickness in a range of about 100 nm to about 200 nm. For example, the metal layer 121 may have a thickness of about 150 nm.

The thickness of the metal layer 121 may be determined in consideration of a first width w1 (refer to FIG. 1B). Considering the gap and strength of the metal line 120 required for polarization, the thickness of the metal layer 121 may be about three times the first width w1 or the first gap s1.

A mask layer 141 may be formed on the metal layer 121. The mask layer 141 may include, for example, silicon oxide ($SiO_x$). Examples of the silicon oxide ($SiO_x$) may include silicon dioxide ($SiO_2$). The mask layer 141 may be formed by chemical vapor deposition. A surface of the metal layer 121 may be protected by the mask layer 141.

The mask layer 141 may have a thickness the same as that of the metal layer 121. Further, the mask layer 141 may have a thickness more than or less than that of the metal layer 121. For example, the mask layer 141 may have a thickness of about 150 nm.

Figure 6B:
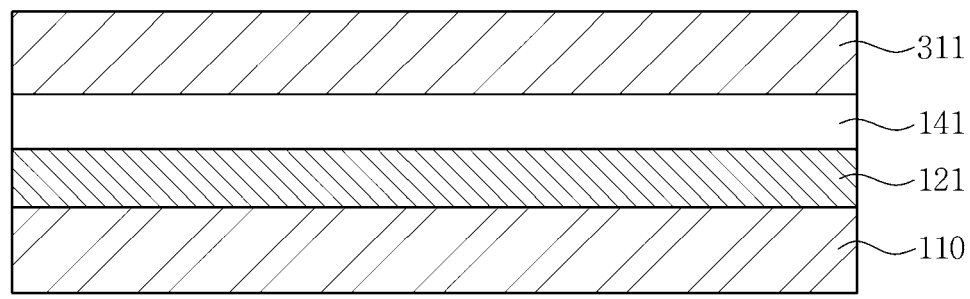

Referring to FIG. 6B, a resist layer 311 may be disposed on the mask layer 141. The resist layer 311 may include resist materials known in the pertinent art. The resist layer 311 may include organic materials.

Figure 6C:
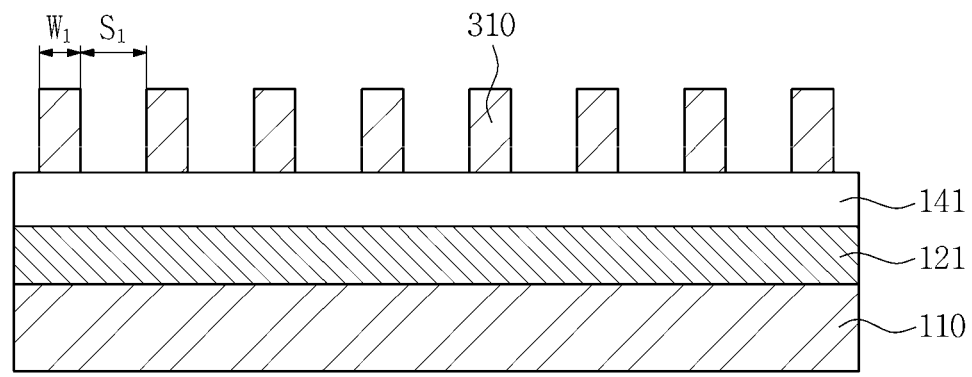

Referring to FIG. 6C, the resist layer 311 may be patterned to thereby form a plurality of resist patterns 310. The resist pattern 310 may be formed by light irradiation or development using a pattern mask, or may be formed in an imprint method using a mold.

The resist pattern 310 may have a cross-section of a protruding shape that has a first width w1, and the plurality of resist patterns 310 may be spaced apart from each other by a first gap s1. Herein, the first width w1 and the first gap s1 may have a ratio of about 1:1. For example, the first width w1 may be in a range of about 30 nm to about 60 nm, and the first gap s1 may be in a range of about 30 nm to about 60 nm. In particular, the first width w1 may be about 50 nm, and the first gap s1 may be about 50 nm.

Figure 6D:
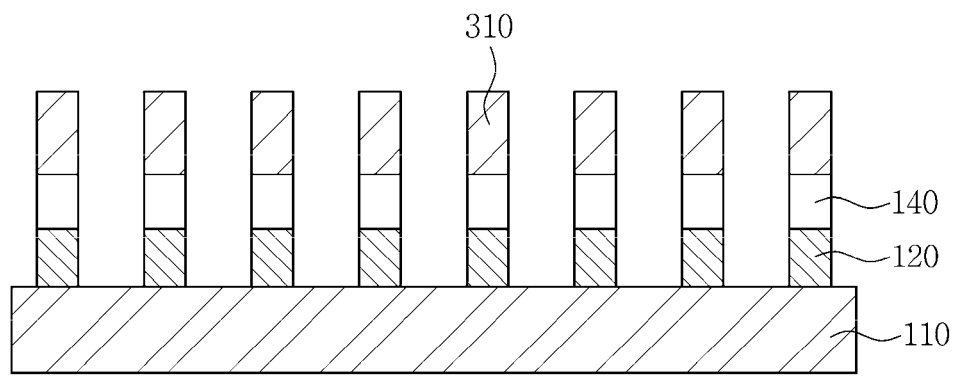

Referring to FIG. 6D, the mask layer 141 and the metal layer 121 may be etched to thereby form a metal line 120 and a mask 140. The plurality of metal lines 120 each may have a first width w1, and may be spaced apart from each other by a first gap s1.

Figure 6E:
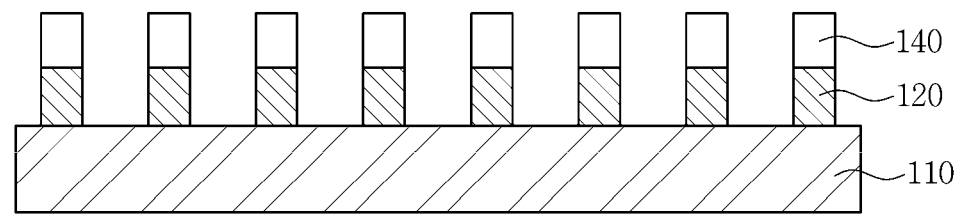

Referring to FIG. 6E, the resist pattern 310 may be removed to thereby form a wire grid pattern including the metal line 120 and the mask 140 on the metal line 120. The size of the wire grid pattern may be determined based on the heights t1 and t2 (see FIG. 3), the first width w1, and the first gap s1 of the metal lines 120 and the masks 140.

Figure 6F:
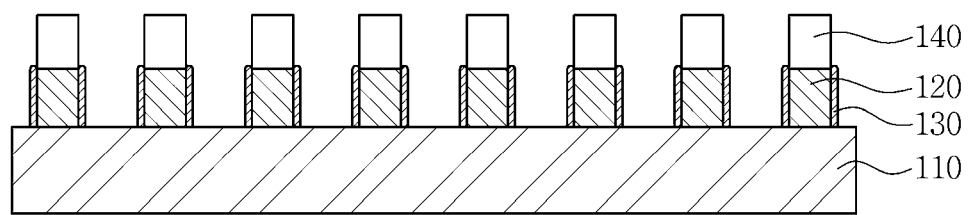

Referring to FIG. 6F, a self-assembled monolayer 130 may be formed on the surface of the metal line 120. The self-assembled monolayer 130 may be a coating layer, an end portion of which is hydrophobic. Due to the composition of the self-assembled monolayer 130 and the mask 140, the self-assembled monolayer 130 does not form on the mask 140. The self-assembled monolayer selectively forms on the metal line 120.

Methods of manufacturing the self-assembled monolayer 130 may include a solution process and a vapor process.

Examples of the solution process may include dipping, micro-contact printing, and spin-coating. A solvent may be used in the solution process.

Dipping is a method in which the substrate 110, disposed with the wire grid patterns 120 and 140, is immersed in a mixture of an organic solvent and materials for a predetermined period of time to form the self-assembled monolayer 130. Spin-coating is a method in which a mixture solution of an organic solvent and materials for forming the self-assembled monolayer is dropped on the substrate 110 using a dropping pipet and the like; the substrate 110 is rotated to uniformly distribute the mixture solution; and then heat is applied to form the self-assembled monolayer 130. Micro-contact printing is a method in which a stamp formed of an elastomer is coated with materials for forming the self-assembled monolayer, and then is brought into contact with the metal line 120 to thereby form the self-assembled monolayer 130.

An example of the vapor process is deposition.

Figure 6G:
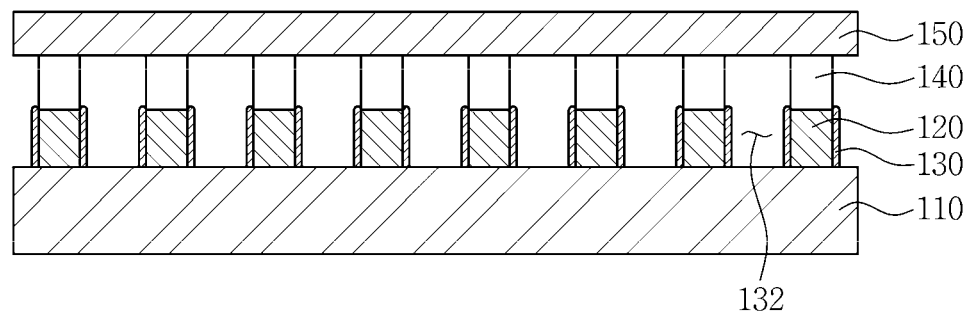

Referring to FIG. 6G, a protective layer 150 may be formed on the mask 140.

The protective layer 150 may be provided in a single plate form across the plurality of masks 140. The protective layer 150 may include insulating materials, for example, silicon nitride ($SiN_x$).

The protective layer 150 may be formed by deposition. Since the self-assembled monolayer 130, which is a hydrophobic coating layer, is disposed on the surface of the metal layer 120, the material for forming the protective layer 150 does not deposit between the metal lines 120.

Hereinafter, a display device according to a fifth exemplary embodiment will be described with reference to FIG. 7.

Figure 7:
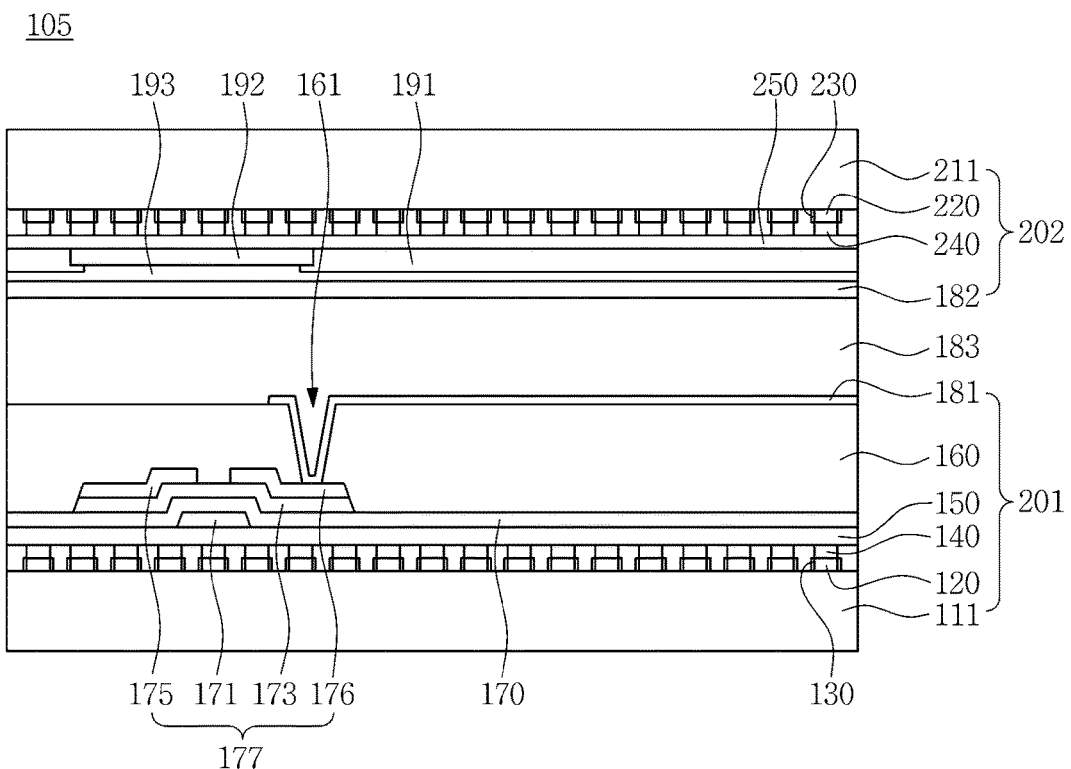
FIG. 7 is a cross-sectional view illustrating a display device according to a fifth exemplary embodiment.

FIG. 7 is a cross-sectional view illustrating the display device 105 according to the fifth exemplary embodiment.

The display device 105 includes an array substrate 201, an opposing substrate 202, and a liquid crystal layer 183 between the array substrate 201 and the opposing substrate 202.

The array substrate 201 includes a first substrate 111, a metal line 120, a mask 140, a protective layer 150, a gate insulating layer 170, a thin film transistor (TFT) 177, a planarizing layer 160, and a first electrode 181.

The metal line 120 is disposed on the first substrate 111. The mask 140 is disposed on an upper portion of the metal line 120, and a self-assembled monolayer 130 is disposed on the surface of the metal line 120. The metal line 120 and the mask 140, disposed on the first substrate 111, may form a lower wire grid pattern. The metal line 120 may be disposed over the whole surface of the first substrate 111 or may be disposed on selected portions of the first substrate 111. According to the fifth exemplary embodiment, the metal line 120 is extended on the surface of the first substrate 111. Since the metal line 120, the mask 140, and the self-assembled monolayer 130 are described above, detailed description pertaining thereto will be omitted.

The protective layer 150 is disposed on the mask 140. The protective layer 150 may include silicon oxide ($SiO_x$) or silicon nitride ($SiN_x$).

A gate electrode 171 and a gate line (not illustrated) are disposed on the protective layer 150. The gate line may be vertically, horizontally, or diagonally, having a predetermined angle, disposed with respect to the metal line 120.

A gate insulating layer 170 is disposed on the protective layer 150 on which the gate electrode 171 and the gate line are disposed. The gate insulating layer 170 may include inorganic materials, such as silicon oxide ($SiO_x$) or silicon nitride ($SiN_x$).

A semiconductor layer 173 is disposed on the gate insulating layer 170. The semiconductor layer 173 may include silicon and/or an oxide semiconductor. The oxide semiconductor may include at least one of indium (In), zinc (Zn), gallium (Ga), tin (Sn), and hafnium (Hf).

A source electrode 175 and a drain electrode 176 are disposed on the semiconductor layer 173, at least partially overlapping the semiconductor layer 173. The source electrode 175 and the drain electrode 176 may be spaced apart from each other. The source electrode 175 may be connected to the data line (not illustrated), and the drain electrode 176 may be connected to the first electrode 181.

The gate electrode 171, the source electrode 175, the drain electrode 176, and the semiconductor layer 173 may together form the TFT 177.

The planarizing layer 160 is disposed on the TFT 177. The planarizing layer 160 may be formed of inorganic materials, such as silicon oxide ($SiO_x$) and silicon nitride ($SiN_x$), or organic materials. Further, the planarizing layer 160 may have a multi-layer structure including an inorganic layer and an organic layer. The planarizing layer 160 may have a contact hole 161, through which the drain electrode 176 is partially exposed.

The first electrode 181 is disposed on the planarizing layer 160. The first electrode 181 may be disposed corresponding to a pixel region, and may be connected to the drain electrode 176 through the contact hole 161.

The opposing substrate 202 includes a second substrate 211, a metal line 220, a mask 240, a protective layer 250, a color filter 191, a black matrix 192, an overcoating layer 193, and a second electrode 182.

The metal line 220 is disposed on a surface of the second substrate 211, the second substrate 211 being opposed to the first substrate 111, and the mask 240 is disposed on the metal line 220. A self-assembled monolayer 230 is disposed on a surface of the metal line 220. The metal line 220 and the mask 240 disposed on the second substrate 211 may form an upper wire grid pattern. The metal line 220 may be disposed over the whole surface of the second substrate 211 or may be disposed on selected portions of the second substrate 211. According to the fifth exemplary embodiment, the metal line 220 is extended on the surface of the second substrate 211. In the fifth exemplary embodiment, the metal lines 220, the masks 240, and the protective layer 250 are formed on a first surface of the second substrate 211. The first surface of the second substrate 211 is the surface that is closest to the first substrate 111. Since the metal line 220, the mask 240, and the self-assembled monolayer 230 are described above, detailed description pertaining thereto will be omitted.

The protective layer 250 is disposed on the mask 240. The protective layer 250 may include silicon oxide ($SiO_x$) or silicon nitride ($SiN_x$).

A black matrix (BM) 192 is disposed on the protective layer 250. The black matrix 192 may be disposed corresponding to an area aside from the pixel region, thereby defining the pixel region. For example, the black matrix 192 may overlap the data line, the gate line, and the TFT 177.

The color filter 191 is disposed on the pixel region defined by the black matrix 192. The color filter 191 may impart colors to light that passes through the liquid crystal layer 183. The color filter 191 may be one of a red color filter, a green color filter, and a blue color filter. The color filter 191 according to the fifth exemplary embodiment may partially overlap the black matrix 192.

The overcoating layer 193 is disposed on the color filter 191 and the black matrix 192. The over coating layer 193 may planarize an upper portion of the color filter 191, and may protect the color filter 191. The overcoating layer 193 may include, for example, acrylic epoxy-based material.

The second electrode 182 is disposed on the overcoating layer 193. The second electrode 182 may be electrically connected with a common line (not illustrated). The second electrode 182 may have a slit pattern having a plurality of apertures. The second electrode 182 may include transparent conductive materials. For example, the second electrode 182 may include indium tin oxide (ITO) or indium zinc oxide (IZO).

The liquid crystal layer 183 is disposed between the array substrate 201 and the opposing substrate 202. The liquid crystal layer 183 may include liquid crystal molecules having optical anisotropy. The liquid crystal molecules may be rearranged in response to an electric field, such that an amount of light passing through the liquid crystal layer 183 may be adjusted.

Hereinafter, a display device according to a sixth exemplary embodiment will be described with reference to FIG. 8.

Figure 8:
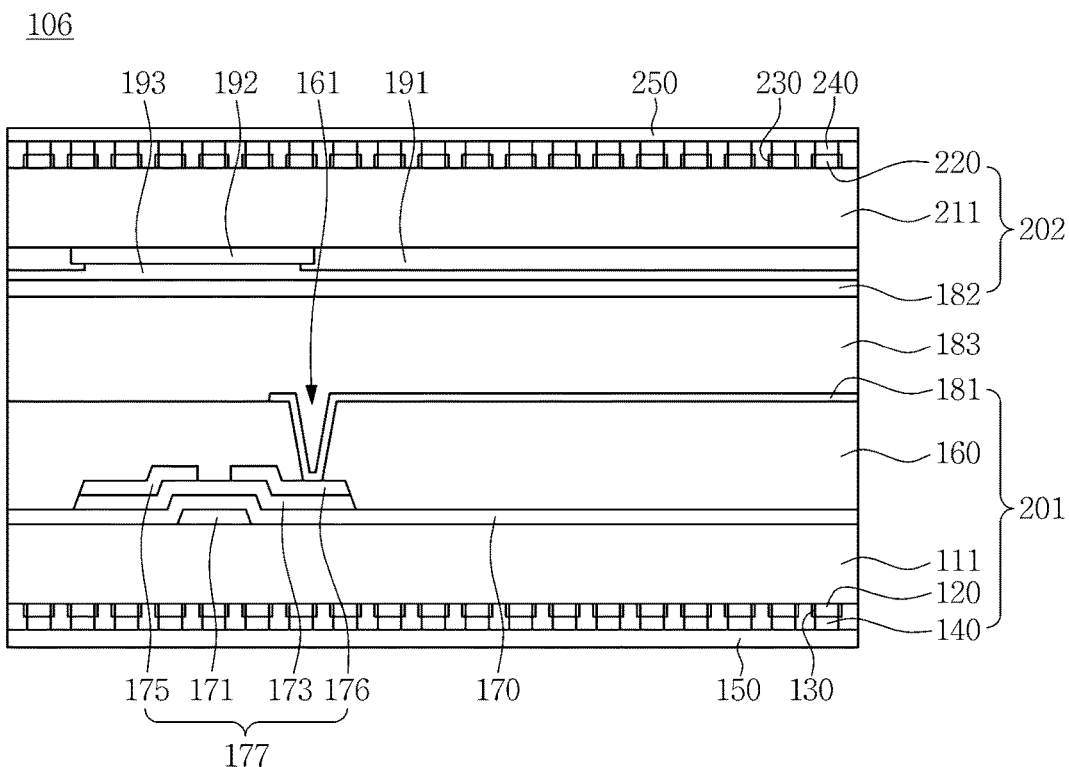
FIG. 8 is a cross-sectional view illustrating a display device according to a sixth exemplary embodiment.

FIG. 8 is a cross-sectional view illustrating a display device 106 according to the sixth exemplary embodiment.

Referring to FIG. 8, the display device 106 according to the sixth exemplary embodiment may have configurations the same as those of the display device 105 of FIG. 7, aside from the position of the metal lines 120 and 220, the masks 140 and 240, and the protective layers 150 and 250 that are disposed on the first substrate 111 and the second substrate 211. Accordingly, any repetitive description will be omitted.

For example, a gate insulating layer 170, a TFT 177, a planarizing layer 160, and a first electrode 181 are disposed on a surface of the first substrate 111; and a metal line 120 and a mask 140 are disposed on another surface of the first substrate 111, thereby forming a lower wire grid pattern. Further, a self-assembled monolayer 130 may be on the surface of the metal line 120, and a protective layer 150 may be disposed on the mask 140 to thereby protect the metal line 120. Herein, a first surface of the first substrate 111 refers to a surface that is closest to a second substrate 211; and a second surface of the first substrate 111 refers to the surface that is farthest away from the second substrate 211.

A color filter 191, a black matrix 192, an overcoating layer 193, and a second electrode 182 are disposed on a first surface of the second substrate 211; and a metal line 220 and a mask 240 are disposed on a second surface of the second substrate 211, thereby forming an upper wire grid pattern. Further, a self-assembled monolayer 230 may be disposed on the surface of the metal line 220, and a protective layer 250 may be disposed on the mask 240, to thereby protect the metal line 220. Herein, the first surface of the second substrate 211 refers to a surface that is closest to the first substrate 111, and the second surface of the second substrate 211 refers to the surface that is farthest away from the first substrate 111.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A polarizer comprising:
    a substrate;
    a plurality of metal lines on the substrate, the plurality of metal lines each having a first width and a first height and being spaced apart from and parallel to each other with a first gap therebetween;

a hydrophobic coating layer on the metal line, and
wherein the hydrophobic coating layer is a self-assembled monolayer which comprises a chemical compound represented by the following Chemical Formula 1:

[Chemical Formula 1]

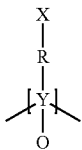

wherein Y is one of silicon (Si), and carbon (C) bonded or unbonded to a substituent;

R is one of:
a substituted or unsubstituted aromatic group having 6 to 30 carbon atoms,
a substituted or unsubstituted heteroaromatic group having 5 to 30 carbon atoms containing one or more hetero atoms,
a substituted or unsubstituted alkylene group having 1 to 20 carbon atoms, and
a substituted or unsubstituted alkylene group having 1 to 20 carbon atoms and containing at least one of

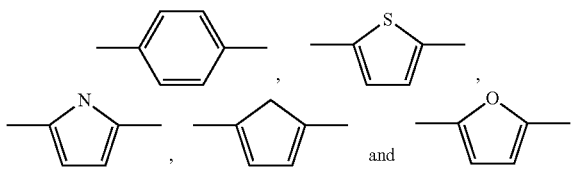

in a main chain, the substituent comprising one or more of a halogen atom, an alkyl group having 1 to 12 carbon atoms that is substituted or unsubstituted with a halogen atom, an alkoxy group, an ether group, a carboxyl group, a thiol group, and an amine group; and X is one of $CF_n$, $CBr_m$, and a substituted or unsubstituted aryl group.

2. The polarizer of claim 1, wherein the first width is in a range of about 50 nm to about 200 nm.

3. The polarizer of claim 1, wherein the first height is in a range of about 50 nm to about 250 nm.

4. The polarizer of claim 1, wherein the first gap is in a range of about 50 nm to about 200 nm.

5. The polarizer of claim 1, wherein the self-assembled monolayer has a thickness in a range of about 0.2 nm to about 5 nm.

6. A polarizer comprising:
a substrate;
a plurality of metal lines on the substrate, the plurality of metal lines each having a first width and a first height and being spaced apart from and parallel to each other with a first gap therebetween, at least one metal line of the plurality of metal lines is in contact with the substrate; and
a hydrophobic coating layer on the at least one metal line,
wherein the hydrophobic coating layer is a self-assembled monolayer which comprises a chemical compound represented by the following Chemical Formula 3:

[Chemical Formula 3]

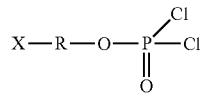

wherein R is one of:
a substituted or unsubstituted aromatic group having 6 to 30 carbon atoms,
a substituted or unsubstituted heteroaromatic group having 5 to 30 carbon atoms containing one or more hetero atoms,
a substituted or unsubstituted alkylene group having 1 to 20 carbon atoms, and
a substituted or unsubstituted alkylene group having 1 to 20 carbon atoms and containing at least one of

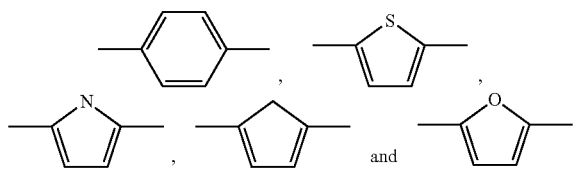

in a main chain, the substituent comprising one or more of a halogen atom, an alkyl group having 1 to 12 carbon atoms that is substituted or unsubstituted with a halogen atom, an alkoxy group, an ether group, a carboxyl group, a thiol group, and an amine group, X is one of $CF_n$, $CBr_m$, and a substituted or unsubstituted aryl group.

7. The polarizer of claim 6, wherein the chemical compound represented by Chemical Formula 3 is represented by any one of the following Chemical Formulas 4 to 6:

[Chemical Formula 4]

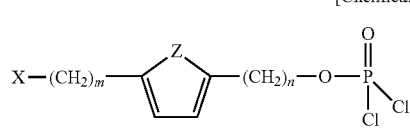

wherein Z is one of sulfur, nitrogen, carbon and oxygen,
m is an integer selected from 0 to 20,
n is an integer selected from 0 to 20, and
X is one of $CF_n$, $CBr_m$, and a substituted or unsubstituted aryl group;

[Chemical Formula 5]

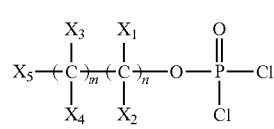

wherein $X_1$, $X_2$, $X_3$, $X_4$, and $X_5$ each independently represent hydrogen, a halogen atom, or an alkyl group having 1 to 30 carbon atoms substituted with one or more of hydrogen, a halogen atom, oxygen or nitrogen,
m is an integer selected from 1 to 20, and
n is an integer selected from 0 to 20; and

[Chemical Formula 6]

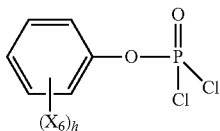

wherein $X_6$ represents a halogen atom or $CF_3$, and h is an integer selected from 1 to 5.

8. The polarizer of claim 1, further comprising a protective layer provided in a plate form and disposed over upper portions of the plurality of metal lines.

9. The polarizer of claim 1, further comprising a plurality of masks being disposed respectively on the plurality of metal lines.

10. The polarizer of claim 9, further comprising a protective layer provided in a plate form and disposed over the plurality of masks.

11. A display device comprising:
a first substrate;
a plurality of metal lines on the first substrate, the plurality of metal lines each having a first width and a first height and being spaced apart from and parallel to each other with a first gap therebetween;
a hydrophobic coating layer on the metal line;
a second substrate;
a liquid crystal layer between the first substrate and the second substrate, and
wherein the hydrophobic coating layer is a self-assembled monolayer which comprises a chemical compound represented by any one of the following Chemical Formulae 1 and 3:

[Chemical Formula 1]

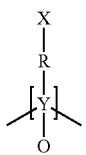

wherein Y is one of silicon (Si), and carbon (C) bonded or unbonded to a substituent;
R is one of:
a substituted or unsubstituted aromatic group having 6 to 30 carbon atoms,
a substituted or unsubstituted heteroaromatic group having 5 to 30 carbon atoms containing one or more hetero atoms,
a substituted or unsubstituted alkylene group having 1 to 20 carbon atoms, and
a substituted or unsubstituted alkylene group having 1 to 20 carbon atoms and containing at least one of

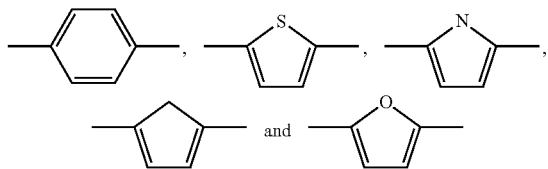

in a main chain, the substituent comprising one or more of a halogen atom, an alkyl group having 1 to 12 carbon atoms that is substituted or unsubstituted with a halogen atom, an alkoxy group, an ether group, a carboxyl group, a thiol group, and an amine group; and
X is one of $CF_n$, $CBr_m$, and a substituted or unsubstituted aryl group;

[Chemical Formula 3]

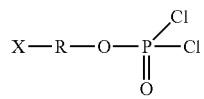

wherein R is one of:
a substituted or unsubstituted aromatic group having 6 to 30 carbon atoms,
a substituted or unsubstituted heteroaromatic group having 5 to 30 carbon atoms containing one or more hetero atoms,
a substituted or unsubstituted alkylene group having 1 to 20 carbon atoms, and
a substituted or unsubstituted alkylene group having 1 to 20 carbon atoms and containing at least one of

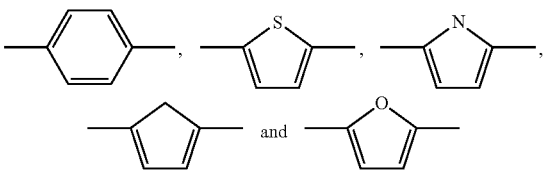

in a main chain, the substituent comprising one or more of a halogen atom, an alkyl group having 1 to 12 carbon atoms that is substituted or unsubstituted with a halogen atom, an alkoxy group, an ether group, a carboxyl group, a thiol group, and an amine group,
X is one of $CF_n$, $CBr_m$, and a substituted or unsubstituted aryl group.

12. The display device of claim 11, wherein the first width is in a range of about 50 nm to about 200 nm.

13. The display device of claim 11, wherein the first height is in a range of about 50 nm to about 250 nm.

14. The display device of claim 11, wherein the first gap is in a range of about 50 nm to about 200 nm.

15. The display device of claim 11, wherein the hydrophobic coating layer is a self-assembled monolayer.

16. The display device of claim 15, wherein the self-assembled monolayer has a thickness in a range of about 0.2 nm to about 5 nm.

17. The display device of claim 11, further comprising:
a plurality of metal lines on the second substrate, the plurality of metal lines each having a first width and a first height and being spaced apart from and parallel to each other with a first gap therebetween; and a hydrophobic coating layer on the metal lines.

18. The polarizer of claim 1, wherein the hydrophobic coating layer is in contact with the substrate.

* * * * *